United States Patent [19]

Lally

[11] Patent Number: 4,679,179
[45] Date of Patent: Jul. 7, 1987

[54] SONAR DETECTION APPARATUS

[75] Inventor: Thomas P. Lally, Mountain View, Calif.

[73] Assignee: Raychem Corporation, Menlo Park, Calif.

[21] Appl. No.: 717,489

[22] Filed: Mar. 29, 1985

Related U.S. Application Data

[63] Continuation of Ser. No. 388,763, Jun. 15, 1982, abandoned.

[51] Int. Cl.[4] .......................... H04R 1/28; H04R 1/44; C08L 75/08; C08L 9/02
[52] U.S. Cl. .................................... 367/162; 367/106; 367/154; 260/DIG. 46; 525/92; 525/129; 525/130; 522/109; 522/110; 522/137
[58] Field of Search .............. 367/106, 130, 154, 162, 367/176; 525/127, 128, 129, 130, 131, 92

[56] References Cited

U.S. PATENT DOCUMENTS

| | | | |
|---|---|---|---|
| 1,960,240 | 5/1934 | Clement | 367/149 |
| 3,427,366 | 2/1969 | Verdol et al. | 525/131 |
| 3,467,572 | 9/1969 | Ahramjian et al. | 528/76 |
| 3,555,311 | 1/1971 | Weber | 367/162 |
| 3,562,355 | 2/1971 | Holden | 525/92 |
| 3,646,158 | 2/1972 | Eustice | 525/131 |
| 3,698,731 | 10/1972 | Jost et al. | 525/131 |
| 3,744,016 | 7/1973 | Davis | 367/154 |
| 3,881,165 | 4/1975 | Parker | 367/149 |
| 3,900,543 | 8/1975 | Davis | 367/154 |
| 4,121,001 | 10/1978 | Gotcher et al. | 204/159.19 |
| 4,176,027 | 11/1979 | Gotcher et al. | 204/159.17 |
| 4,302,552 | 11/1981 | Hongu et al. | 260/DIG. 46 |
| 4,387,139 | 6/1983 | Herwig et al. | 204/159.19 |
| 4,390,976 | 6/1983 | Eynck | 367/162 |
| 4,399,526 | 8/1983 | Eynck | 367/162 |
| 4,402,067 | 8/1983 | Miller | 367/176 |

FOREIGN PATENT DOCUMENTS 2063007 5/1981 United Kingdom ............... 367/176

Primary Examiner—John C. Bleutge
Assistant Examiner—A. Koeckert
Attorney, Agent, or Firm—Timothy H. P. Richardson; Herbert G. Burkard

[57] ABSTRACT

Polymer compositions comprising a segmented urethane block polymer and an elastomer having a glass transition temperature between −40° and +15° C. possess a good combination of properties, including relatively high damping and modulus values. Radiation cross-linked tubing prepared from these compositions finds application in the jacketing of marine sonar detection arrays comprising hydrophones.

9 Claims, 3 Drawing Figures

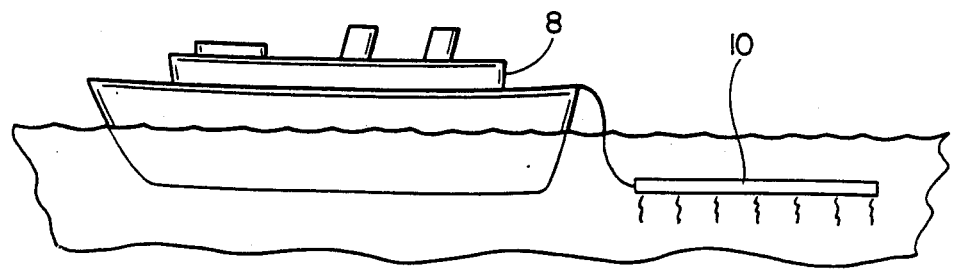
FIG_1
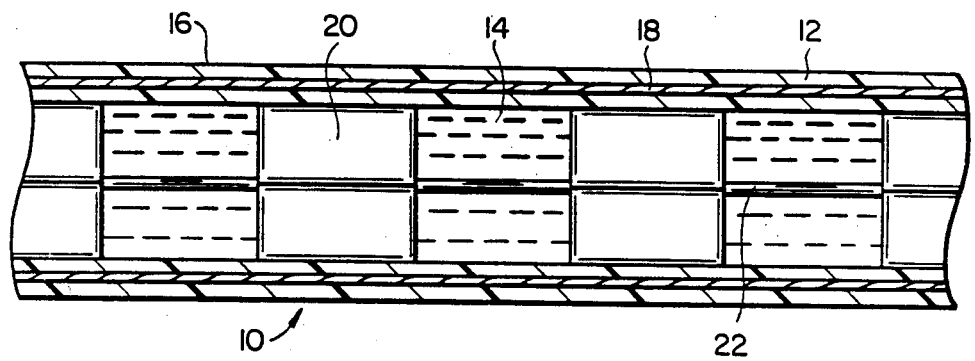
FIG_2
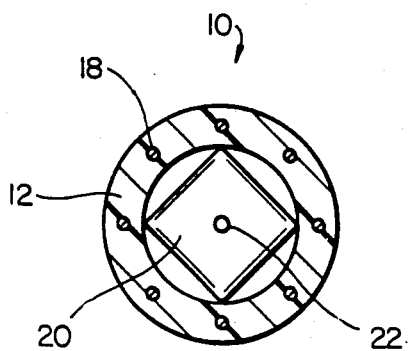
FIG_3

SONAR DETECTION APPARATUS

CROSS-REFERENCE TO RELATED APPLICATION

This application is a continuation of application Ser. No. 388,763, filed June 15, 1982, now abandoned.

BACKGROUND OF THE INVENTION

1. Field of the Invention

This invention relates to high damping polymer compositions, and to shaped articles produced therefrom, in particular jacketing for sonar detection arrays.

2. Introduction to the Invention

Many navies throughout the world employ sonar detection arrays to locate and identify vessels at sea. These arrays, which may be 100 meters or more in length, are towed behind a ship by a towline and are isolated from the towline by a vibration isolation module. A detection arrary typically comprises a series of sensing sections, each of which is for example 15 to 30 meters in length. Each sensing section comprises a plurality of hydrophones (located at precise distances from one another), together with the necessary ancillary electronic components, inside a semi-rigid tubular jacket, typically 2 to 10 centimeters in diameter. The tubing is filled with an acoustically transparent fluid, typically a mixture of aliphatic hydrocarbons (although silicone fluids have been proposed), to improve the acoustic coupling between the hydrophones and the water surrounding the tubing.

The tubing often contains, embedded in the wall and running parallel to the longitudinal axis, reinforcing yarn. The main reason for this is to provide the tubing with a very high modulus in the longitudinal direction; if the tubing is readily extensible, this can upset the critical spacing of the hydrophones and can create turbulence, and hence noise, in the acoustic fluid.

It will be readily apparent that a high sensitivity of detection is desirable and that since this sensitivity is partly determined by the signal-to-noise ratio reaching the hydrophones, it is advantageous to reduce the acoustic noise generated within or by the array. As the array is pulled through the water, noise is generated from three separate mechanical excitations. The first is towline excitation originating either at the vessel or as towline strumming due to vortex shedding. The second is a tail end effect; array tension is low and the array may be susceptible to 'snaking' instability. The third, and most important, noise source is the turbulent boundary layer (TBL) which develops as the array is drawn through water. The way in which the TBL creates noise is by generating bulge waves (either resonant or non-resonant). The entire success of towed arrays depends on the isolation of the hydrophones from these surface pressures (whose spectral level increases as the fourth power of speed).

It is desirable, then, to use a tubing which provides for maximum transmission of the acoustic signals that the sensors are attempting to detect but which minimizes the noise created by the array. One way of significantly reducing noise is to use a material exhibiting high mechanical damping. It is also important that the material should not be too flexible, as this will more readily permit the generation of bulge waves. Secondary considerations include the density of the material, abrasion resistance, resistance to the fill fluids and water, low temperature flexibility, creep resistance, the ability to take a good surface finish, and (for economic reasons) the ability to manufacture in continuous lengths.

Materials used in the past for jacketing sonar detection arrays include plasticised polyvinyl chloride (PVC) and various rubbers, eg. butyl rubber and nitrile rubber. However, the rubbers suffer from disadvantages such as poor processing characteristics (especially for long lengths), poor abrasion resistance, insufficient stiffness, excessive weight and insufficient solvent resistance. Plasticised PVC can be easily processed, but is too stiff at low temperatures and the plasticiser is leached out by the acoustic fluids.

SUMMARY OF THE INVENTION

I have now discovered new polymeric compositions which have a combination of damping and modulus characteristics (and other properties) which makes them particularly useful as tubing for sonar detection apparatus. The invention will chiefly be described by reference to use of the new compositions in sonar detection apparatus, but it is to be understood that the compositions can also be used for other purposes.

In one aspect, the present invention provides a polymer composition which comprises (a) 40 to 70%, preferably 50 to 60%, by weight, based on the total polymer, of an elastomer which has a glass transition temperature ($T_g$) of $-40°$ to $+15°$ C., preferably $-25°$ to $+5°$ C., and (b) 60 to 30%, preferably 50 to 40%, by weight based on the total polymer, of a segmented urethane block polymer.

Glass transition temperatures given herein are measured by means of a differential scanning calorimeter. The composition is preferably in the form of a tube or other shaped article which has been radiation cross-linked to improve its abrasion and solvent resistance, modulus and other mechanical properties. The radiation dose, which may be for example 5–15 megarads, should not be too high, however, because the effect of cross-linking is usually to lower the damping coefficient. Preferably the elastomer and polyurethane are chosen so that the radiation causes cross-linking of the elastomer, but does not substantially cross-link the polyurethane.

BRIEF DESCRIPTION OF THE DRAWING

The invention is illustrated in the accompanying drawing, in which

FIG. 1 is a sketch of sonar detection apparatus of the invention being used for sonar detection;

FIG. 2 is a longitudinal cross-sectional view of the sonar detection apparatus of FIG. 1; and FIG. 3 is a transverse cross-sectional view of the sonar detection apparatus of FIG. 1.

DETAILED DESCRIPTION OF THE INVENTION

The performance of a particular tubing in a sonar detection apparatus depends not only on the composition used for the tubing but also the dimensions of the tubing. Typical dimensions for such tubing are an outer diameter of 2 to 10 cm and a wall thickness which is from 2 to 8 mm and from 0.05 to 0.15 times the outer diameter. For tubing of such dimensions, standardized measurements of damping coefficients and modulus values of test specimens of the compositions provide an excellent guide to the value of the compositions in practical sonar detection apparatus. The damping coefficients (tan δ values) and the modulus values (the real part of the complex dynamic modulus, designated $G^1$) given herein are measured on the Rheometrics Mechanical Spectrometer (RMS-605) in accordance with the procedures described in Section 6.4 (Forced torsional Oscillation) of the Operations Manual published by Rheometrics Inc. (Issue 0381), using a strain rate of 1% and a frequency sweep from 0.1 to 100 Hz.

Preferred compositions of the invention have a damping coefficient which meets at least one of the following requirements:

(a) at least 0.1, preferably at least 0.2, especially at least 0.3, at all frequencies in the range 10 to 100 Hz, preferably 1 to 100 Hz, at all temperatures in the range 5° to 15° C., preferably 0° to 25° C.;

(b) at least 0.30, preferably at least 0.35, at least one frequency in the range 1 to 100 Hz, preferably 10 to 100 Hz, at at least one temperature in the range 0° to 25° C., preferably 5° to 15° C.

It is also preferred that the composition should have a modulus ($G^1$) of at least 0.7, preferably at least $1.0 \times 10^7$ dynes/cm$^2$, at all frequencies in the range 10 to 100 Hz, preferably 1 to 100 Hz, at all temperatures in the range 5° to 15° C., preferably 0° to 25° C.

Polyurethanes suitable for use in this invention are commercially available, and reference may be made for example to Polymer Engineering and Science, September 1971, volume 11, No. 15, pages 369–376. Polyether urethane block polymers are preferred because they have better hydrolytic stability.

Elastomers suitable for use in this invention are also commercially available. Suitable elastomers include acrylic rubbers (including alkyl acrylate rubbers, which are preferred, and alkoxy acrylate rubbers), fluoroelastomers (in particular vinylidene fluoride/hexafluoropropylene rubbers), vinyl acetate/ethylene copolymer rubbers (eg. containing 55–75% by weight of vinyl acetate), ethylene/acrylic elastomers nitrile elastomers and mixtures of two or more of these.

The specific gravity of the polymeric composition is preferably less than 1.5, particularly less than 1.3.

Prior to radiation cross-linking, the composition preferably contains a small amount, eg. 0.7 to 4%, of a radiation cross-linking agent, eg. triallyl isocyanurate. The composition may also contain relatively small amounts, usually less than 25%, preferably less than 15%, by weight of the composition of other polymers and/or other additives, including, in particular, fillers, e.g. carbon black in the amount of 5–12%. The presence of such additives generally has an adverse effect on damping, but may be desirable for other reasons, eg. to improve processability or for UV stabilization. The additives, if present, should not be extracted by the acoustic fluid or by sea water.

Referring now to FIG. 1, this shows sonar detection apparatus 10 being towed by a vessel 8 in the open sea. As shown in FIGS. 2 and 3, the apparatus comprises a tube 12 composed of a cross-linked composition as defined and containing longitudinal rinforcing members 18. Within the tube are a plurality of hydrophenones 20 linked to each other by cable 22, and the tube is filled by acoustic coupling fluid 14.

EXAMPLES

The invention is illustrated by the Examples which are summarized in the Table below. In each of the Examples, the ingredients and amounts thereof (in parts by weight) listed in the Table were thoroughly blended together, e.g. in a Banbury mixer, and then pressed into test slabs (Examples 1–24) or extruded into tubing (Examples 24–27). A number of the test slabs and tubings, as indicated in the Table, were cross-linked by irradiating them to a dosage of 10 Megarads. The damping and modulus characteristics of the test slabs were measured and the results shown in the Table were obtained.

The various ingredients shown in the Table are further identified below:

2103-80A-E (Upjohn "Pellathane" 2103-80A-E): a polyether polyurethane block copolymer, $T_g$ about $-10°$ C.

2103-90A-E (Upjohn "Pellathane" 2103-90A-E): a polyether polyurethane block copolymer Hycar 1042 (Goodrich): a butadiene/acrylonitrile elastomer, $T_g$ about $-30°$ C.

Hycar 4051 (Goodrich): an acrylic rubber, $T_g$ about $-18°$ C.

Hypalon 40 (duPont): a chlorosulfonated polyethylene

VAE 711 (Wacker): a vinyl acetate/ethylene copolymer (70% w/w/ vinyl acetate), $T_g$ about $-5°$ C.

Vamac B-124 (duPont): an ethylene/methyl acrylate elastomer masterbatch containing 20 parts, per hundred parts of rubber, of a semi-reinforcing furnace black Viton A-HV (duPont): a vinylidene fluoride/hexafluoropropene elastomer, Tg about $-20°$ C.

Sterling SO: a semi-rinforcing oil-type furnace black, particle size about 41 millimicrons TAIC: triallyl isocyanurate, a radiation cross-linking agent.

TABLE

| | Example No. | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Polyurethane | | | | | | | | | | | | | | |
| 2103-80 A-E | 69 | 69 | 59 | 59 | 69 | 69 | 59 | 59 | 69 | 69 | 69 | 79 | 69 | 79 |
| 2103-90 A-E | | | | | | | | | | | | | | |
| Elastomer | | | | | | | | | | | | | | |
| Hycar 1042 | | | | | 30 | 30 | 40 | 40 | | | | | | 20 |
| Hycar 4051 | 30 | 30 | 40 | 40 | | | | | | | | | | |
| Hypalon 40 | | | | | | | | | | | | | | |
| VAE 711 | | | | | | | | | | | 30 | | | |
| Vamac B-124 | | | | | | | | | | | | 20 | 30 | |
| Viton A-HV | | | | | | | | | 30 | 30 | | | | |
| Filler - Sterling 50 | | | | | | | | | | | | | | |
| Cross-linking Agent - TAIC | 1 | 1 | 1 | 1 | 1 | 1 | 1 | 1 | 1 | 1 | 1 | 1 | 1 | 1 |
| Cross-linking Dose (Mrad) | 0 | 10 | 0 | 10 | 0 | 10 | 0 | 10 | 0 | 10 | 0 | 0 | 0 | 0 |
| Damping Coefficient | | | | | | | | | | | | | | |
| at 25° C. and 100 Hz | 0.25 | 0.28 | 0.38 | 0.31 | 0.18 | 0.15 | 0.28 | 0.07 | 0.31 | 0.28 | 0.15 | 0.25 | 0.29 | 0.46 |
| at 25° C. and 10 Hz | 0.14 | 0.18 | 0.21 | 0.18 | 0.11 | 0.09 | 0.20 | 0.10 | 0.26 | 0.19 | 0.14 | 0.16 | 0.18 | 0.29 |

TABLE-continued

|  |  |  |  |  |  |  |  |  |  |  |  |  |  |
|---|---|---|---|---|---|---|---|---|---|---|---|---|---|
| at 10° C. and 100 Hz | 0.28 | 0.28 | 0.54 | 0.33 | 0.25 | 0.19 | — | 0.27 | — | 0.25 | — | 0.35 | 0.38 | 0.70 |
| at 10° C. and 10 Hz | 0.26 | 0.27 | 0.43 | 0.32 | 0.18 | 0.13 | — | 0.15 | — | 0.20 | — | 0.29 | 0.34 | 0.34 |
| at 0° C. and 100 Hz |  |  |  |  |  |  |  |  |  |  |  |  |  |  |
| at 0° C. and 10 Hz |  |  |  |  |  |  |  |  |  |  |  |  |  |  |
| $G' \times 10^{-7}$ (dynes/cm$^2$) |  |  |  |  |  |  |  |  |  |  |  |  |  |  |
| at 25° C. and 100 Hz | 2.2 | 1.1 | 0.88 | 1.1 | 2.0 | 1.9 | 0.41 | 1.6 | 1.4 | 1.3 | 1.8 | 1.1 | 1.5 | 0.62 |
| at 25° C. and 10 Hz | 1.4 | 0.62 | 0.52 | 0.65 | 1.4 | 1.3 | 0.29 | 1.8 | 0.8 | 0.8 | 1.2 | 0.7 | 0.95 | 0.43 |
| at 10° C. and 100 Hz | 3.6 | 2.3 | 1.9 | 2.6 | 2.5 | 2.8 | — | 2.3 | — | 2.8 | — | 2.0 | 3.0 | 0.80 |
| at 10° C. and 10 Hz | 2.0 | 1.2 | 0.8 | 1.2 | 1.5 | 1.8 | — | 1.4 | — | 1.6 | — | 1.2 | 1.5 | 0.71 |
| at 0° C. and 100 Hz |  |  |  |  |  |  |  |  |  |  |  |  |  |  |
| at 0° C. and 10 Hz |  |  |  |  |  |  |  |  |  |  |  |  |  |  |

| | Example No. | | | | | | | | | | | | |
|---|---|---|---|---|---|---|---|---|---|---|---|---|---|
|  | 15 | 16 | 17 | 18 | 19 | 20 | 21 | 22 | 23 | 24 | 25 | 26 | 27 |
| Polyurethane |  |  |  |  |  |  |  |  |  |  |  |  |  |
| 2103-80 A-E | 79 |  | 64 | 44 | 54 | 54 | 44 |  | 49 | 62 | 71 | 52 | 69 |
| 2103-90 A-E |  | 69 |  |  |  |  |  | 54 |  |  |  |  |  |
| Elastomer |  |  |  |  |  |  |  |  |  |  |  |  |  |
| Hycar 1042 |  |  |  |  |  |  |  |  |  |  |  |  |  |
| Hycar 4051 |  |  |  |  | 15 | 20 |  |  |  |  | 18 | 37 |  |
| Hypalon 40 |  |  |  |  |  |  |  |  |  |  |  |  |  |
| VAE 711 |  | 30 | 25 | 25 | 20 | 20 | 25 | 20 | 40 | 27 |  |  |  |
| Vamac B-124 | 20 |  |  |  |  |  |  |  |  |  |  |  |  |
| Viton A-HV |  |  |  | 20 | 15 |  |  | 15 |  |  |  |  | 30 |
| Filler - Sterling 50 |  |  | 10 | 10 | 10 | 10 | 10 | 10 | 10 | 10 | 10 | 10 | — |
| Cross-linking Agent - TAIC | 1 | 1 | 1 | 1 | 1 | 1 | 1 | 1 | 1 | 1 | 1 | 1 | 1 |
| Cross-linking Dose (Mrad) | 0 | 10 | 10 | 10 | 10 | 10 | 10 | 10 | 10 | 10 | 10 | 10 | 10 |
| Damping Coefficient |  |  |  |  |  |  |  |  |  |  |  |  |  |
| at 25° C. and 100 Hz | 0.14 | 0.38 | 0.26 | 0.30 | 0.20 | 0.27 | 0.31 | 0.30 | 0.28 |  |  |  |  |
| at 25° C. and 10 Hz | 0.08 | 0.30 | 0.16 | 0.19 | 0.13 | 0.17 | 0.22 | 0.28 | 0.18 |  |  |  |  |
| at 10° C. and 100 Hz | 0.17 | 0.41 | 0.37 | 0.51 | 0.18 | 0.18 | 0.31 | 0.22 | 0.42 |  |  |  |  |
| at 10° C. and 10 Hz | 0.14 | 0.39 | 0.30 | 0.55 | 0.21 | 0.20 | 0.38 | 0.29 | 0.40 |  |  |  |  |
| at 0° C. and 100 Hz |  |  |  | 0.32 | 0.20 | 0.23 | 0.20 |  | 0.26 |  |  |  |  |
| at 0° C. and 10 Hz |  |  |  | 0.37 | 0.13 | 0.38 | 0.31 |  | 0.35 |  |  |  |  |
| $G' \times 10^{-7}$ (dynes/cm$^2$) |  |  |  |  |  |  |  |  |  |  |  |  |  |
| at 25° C. and 100 Hz | 2.7 | 0.86 | 0.86 | 1.1 | 2.4 | 1.2 | 0.85 | 2.1 | 0.59 |  |  |  |  |
| at 25° C. and 10 Hz | 2.0 | 0.48 | 0.54 | 0.8 | 1.9 | 0.9 | 0.60 | 1.4 | 0.51 |  |  |  |  |
| at 10° C. and 100 Hz | 3.5 | 1.7 | 1.5 | 2.0 | 5.0 | 5.7 | 3.6 | 4.9 | 2.1 |  |  |  |  |
| at 10° C. and 10 Hz | 2.4 | 1.1 | 0.78 | 1.0 | 3.1 | 4.7 | 1.8 | 3.4 | 1.1 |  |  |  |  |
| at 0° C. and 100 Hz |  |  |  | 3.1 | 2.4 | 4.5 | 4.5 |  | 3.7 |  |  |  |  |
| at 0° C. and 10 Hz |  |  |  | 1.9 | 1.9 | 2.5 | 3.1 |  | 2.1 |  |  |  |  |

I claim:

1. Sonar detection apparatus suitable for towing behin a ship and comprising:
   (1) a longitudinally reinforced tube composed of a radiation cross-linked polymeric composition which comprises
      (a) 40 to 70 percent by weight, based on the total polymer, of a radiation cross-linked elastomer having a glass transition temperature of −40° C. to +15° C.; and
      (b) 60 to 30 percent by weight, based on the total polymer, of a segmented urethane block polymer and which has a damping coefficient of at least 0.1 at at least one frequency in the range from 1 Hz to 100 Hz at at least one temperature, in the range from 0° C. to 25° C.;
   (2) a plurality of hydrophones within said tube; and
   (3) an acoustic coupling fluid between the tube and the hydrophones.

2. Apparatus according to claim 1 wherein the tube has an outer diameter of from 2 to 10 centimeters and a wall thickness which is from 2 to 8 millimeters and from 0.05 to 0.15 times the outer diameter.

3. Apparatus according to claim 1 wherein the composition has a damping coefficient of at least 0.20 at all frequencies in the range from 1 Hz to 100 Hz at all temperatures in the range from 0° C. to 25° C.

4. Apparatus according to claim 1 wherein the polymeric composition comprises a radiation cross-linked blend of a polyether urethane block polymer and an elastomer selected from the group consisting of acrylic rubbers, fluoroelastomers, vinyl acetate/ethylene copolymers, ethylene/acrylic elastomers and nitrile elastomers and mixtures of two or more of these.

5. Apparatus according to claim 4 wherein the elastomer is selected from the group consisting of alkylacrylate rubbers, vinylidene fluoride/hexafluoropropene copolymers, and vinyl acetate/ethylene copolymers containing 55-75% by weight of vinyl acetate.

6. Apparatus according to claim 1 wherein the polymeric composition contains 50 to 60% by weight of the elastomer.

7. Apparatus according to claim 1 wherein said elastomer is selected from the group consisting of acrylic rubbers, fluoroelastomers, vinyl acetate/ethylene copolymers, ethylene/acrylic elastomers, nitrile elastomers, and mixtures thereof.

8. Apparatus according to claim 1 wherein the polymeric composition has a damping coefficient of at least 0.20 at all frequencies in the range from 10 Hz to 100 Hz at all temperatures in the range from 5° C. to 15° C.

9. Apparatus according to claim 1 wherein the polymeric composition has a modulus of at least $1.0 \times 10^7$ dynes/cm$^2$ at all frequencies in the range 10 to 100 Hz at all temperatures in the range 5° to 15° C.

* * * * *